Jan. 19, 1932.    W. MULLEN    1,842,109
ADJUSTABLE RAKE
Filed Dec. 7, 1927    2 Sheets-Sheet 1
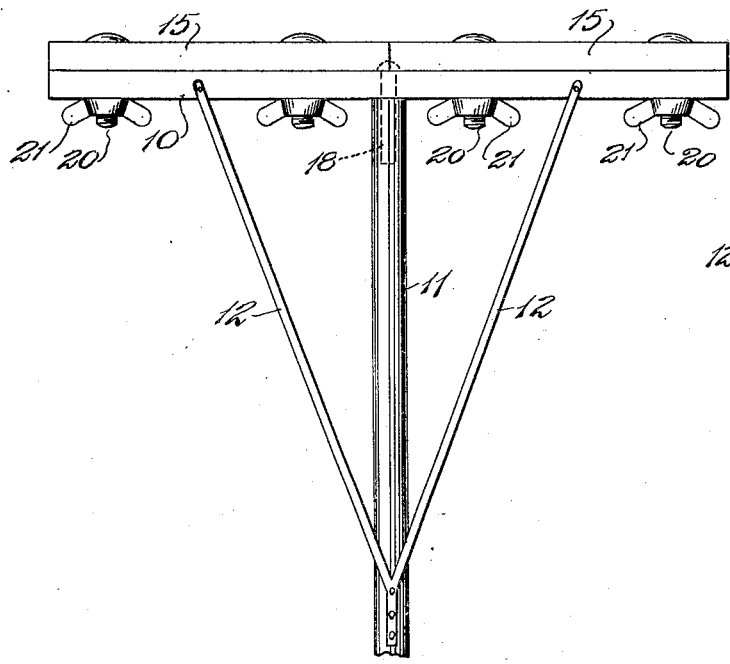
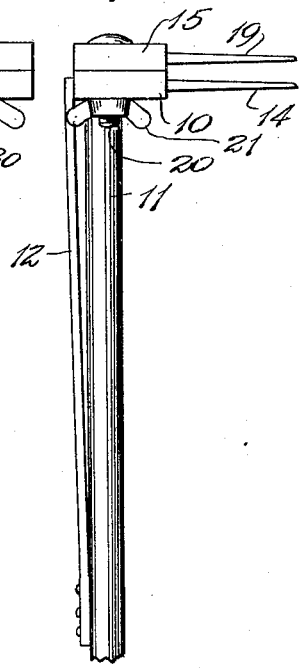
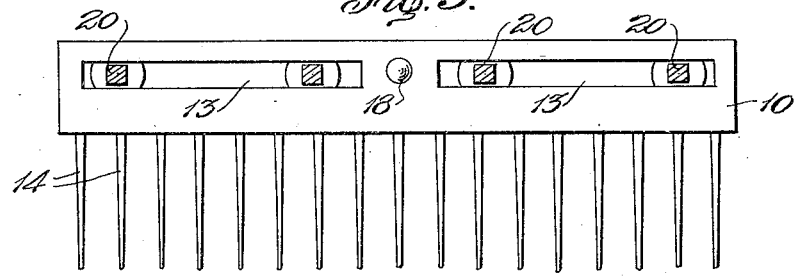
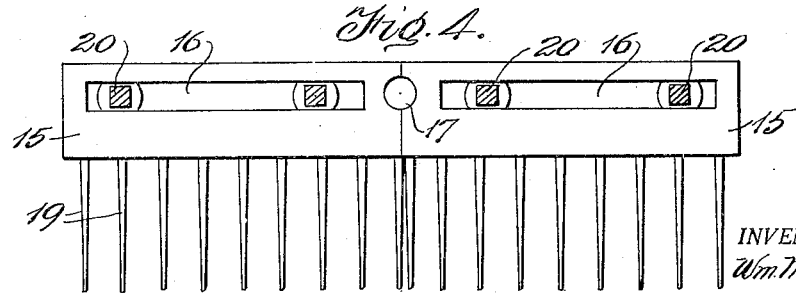
INVENTOR.
Wm Mullen,
BY L. N. Gillis
ATTORNEY.

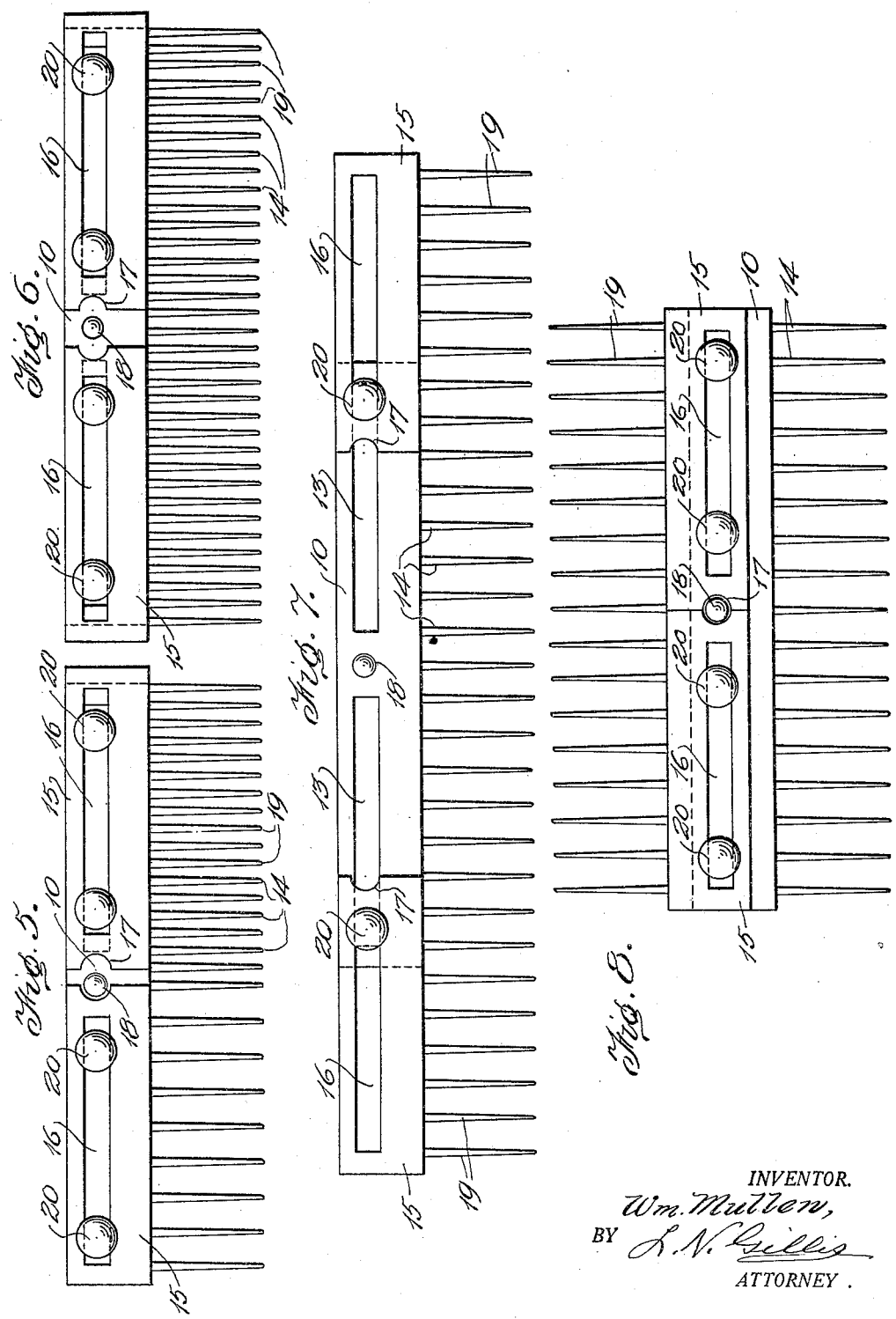

Patented Jan. 19, 1932

1,842,109

UNITED STATES PATENT OFFICE

WILLIAM MULLEN, OF NEW BEDFORD, MASSACHUSETTS; HELEN M. MULLEN ADMINIS-
TRATRIX OF SAID WILLIAM MULLEN, DECEASED

ADJUSTABLE RAKE

Application filed December 7, 1927. Serial No. 238,423.

This invention relates to agricultural implements and has special reference to an adjustable rake.

It is a well known fact that for certain purposes it is desirable to use a rake having widely spaced teeth and for other purposes it is desirable to use a rake having closely spaced teeth. Also in certain situations raking can best be accomplished with a rake having a narrow head while for other classes of work a rake having a wide head is desirable. Still further, it is sometimes of advantage to have one half of the rake arranged with fine or closely spaced teeth and the other half with coarse or widely spaced teeth.

Now rakes have been made with two sets of teeth which can either be positioned one behind the other or with the teeth of one set intermediate the spacing of the teeth of the other set. Such rakes are made by having one set of teeth shiftable laterally with respect to the other set but rakes of this kind cannot be arranged to have part of the teeth closely spaced and the others widely spaced nor can such heads be extended equally on both sides of the handle so that the raking operation can be readily performed.

The principal object of the present invention is to provide an improved form of rake head wherein a wide variety of arrangements of rake teeth can be obtained as well as an adjustment of the head in width to various widths while at the same time maintaining the handle centrally between the ends of the head so that when the handle is drawn upon there will be no tendency for the rake to drag more on one side than the other.

Another important object of the invention is to provide an improved rake wherein the teeth may be either arranged all on the lower side of the head or partly on the lower and partly on the upper so that a reversible rake is provided.

With the above and other objects in view as will be hereinafter apparent the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of a rake head showing a portion of the handle, the head being constructed in accordance with the present invention.

Figure 2 is a side elevation thereof.

Figure 3 is a view of the main member of the rake head in front elevation.

Figure 4 is a view similar to Figure 3 showing the two half heads employed.

Figure 5 is an elevation from in front of the rake showing one half the teeth arranged for fine raking and the others arranged for coarse raking.

Figure 6 is a similar view showing all the teeth arranged for fine raking.

Figure 7 is a similar view showing the rake head extended to form a wide rake with coarsely spaced teeth.

Figure 8 is a similar view showing the rake head arranged with teeth projecting both upwardly and downwardly.

In the present construction of the invention there is provided a main head member 10 from which extends a handle 11, the head member being braced to the handle by suitable braces 12 which may be of any preferred character or construction. This main head has on each side of the handle a slot 13 extending laterally away from the handle. Evenly spaced teeth 14 project downwardly from the main head. On the forward face of this main head is mounted a pair of half heads 15 each having a slot 16 and the inner ends of the heads are notched as at 17 to embrace the bolt 18 which holds the handle on the head 10. Teeth 19 project downwardly from these half heads and are spaced the same as the teeth 14. Through the slots 13 and 16 pass the securing bolts 20 carrying the thumb nuts 21.

In use the normal position is that shown in Figures 3 and 4 where it will be seen that when the half heads are brought together as in Figure 4 the teeth 19 will be positioned in alinement with the teeth 14 so that the spacing of the teeth for raking purposes is that between the teeth 14. If it is desired to arrange one half of the rake for fine raking and the other for coarse the nuts 20 on one side are loosened and one of the half heads 15 moved out as in Figure 5 to bring the teeth 19 centrally between the teeth 14. The nuts 21 are now tightened and the rake will be as shown in Figure 5. If it is desired to have the whole rake fine it is merely necessary to move both the half heads outward as in Figure 6.

In order to extend the rake to a greater width the half heads 15 are moved outwardly one or more tooth spaces in accordance with the extreme width desired. When moved fully outward the widest adjustment will be obtained, if desired, by removing one of the bolts 20 so that but one bolt is left for clamping as at Figure 7.

In order to make a reversible rake it is merely necessary to remove the bolts and turn the half heads 15 upside down as shown in Figure 8, the bolts being replaced and screwed up to secure the parts in position.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. An adjustable rake comprising a handle, a head fixed to the end of the handle and provided with a row of teeth spaced relatively wide apart, a pair of adjustable head sections arranged to overlie the side of the main head to slide thereon and having spaced teeth adapted to align with the fixed teeth or to be spaced equidistantly therebetween by the adjustment of the slidable sections, said slidable sections being adjustable on the main head independently of each other to extend the width of the rake either at one or both sides and also being reversible in position top-for-bottom to provide a set of teeth on the upper side of the head, and means for clamping the adjustable sections to the main head in their different positions of adjustment thereon.

2. An adjustable rake comprising a handle, a head fixed to the end of the handle and provided with a row of teeth spaced therealong, said head having elongated slots extending longitudinally of its upper edge and laterally with respect to the handle, a pair of adjustable head sections adapted to overlie the side of the main head to slide thereon and provided with longitudinal slots registering with the slots in the head, said adjustable sections having spaced teeth arranged to align with the teeth on the main head in one position of adjustment and to be disposed equidistantly therebetween in another position of adjustment, and bolts extending through the slots in the head and the slidable sections to releasably clamp the parts in adjusted relation whereby their teeth may be spaced with a fine or coarse adjustment or the width of the rake extended at one or both sides by sliding the adjustable sections outwardly thereon, and also to provide a double rake by reversing the adjustable sections in position with their teeth extending in the opposite direction from the teeth on the main head.

In testimony whereof I affix my signature.

WILLIAM MULLEN.